United States Patent [19]

Yamamoto et al.

[11] Patent Number: 5,078,934
[45] Date of Patent: Jan. 7, 1992

[54] METHOD FOR PRODUCTION OF FIBER-REINFORCED THERMOSETTING RESIN MOLDING MATERIAL

[75] Inventors: Shigehiro Yamamoto, Matsubara; Katsushige Tamura, Akashi; Hideo Saijyo, Takatsuki; Terukuni Hashimoto, Itami, all of Japan

[73] Assignee: Nippon Shokubai Kagaku Kogyo Co., Ltd., Osaka, Japan

[21] Appl. No.: 329,757

[22] Filed: Mar. 28, 1989

[30] Foreign Application Priority Data

Mar. 29, 1988 [JP] Japan .................. 63-73325

[51] Int. Cl.$^5$ .............. B29C 41/28; B29C 41/32; B29C 41/50
[52] U.S. Cl. .................. 264/102; 65/3.43; 264/112; 264/175; 425/371; 425/373
[58] Field of Search ............... 264/102, 123, 126, 134, 264/137, 175, 112; 425/363, 367, 368, 371, 373, 81.1, 83.1; 156/555, 580, 583.3, 62.2, 285, 324; 29/116.2; 100/154, 169, 211; 427/196, 294, 296, 424, 425, 426; 118/303, 308, 322, 324, 325; 65/3.43

[56] References Cited

U.S. PATENT DOCUMENTS

| | | | |
|---|---|---|---|
| 3,586,573 | 6/1971 | Vissers | 425/371 X |
| 4,315,965 | 2/1982 | Mason et al. | 264/126 X |
| 4,402,785 | 9/1983 | Withers | 156/580 X |
| 4,702,872 | 10/1987 | Yamamoto et al. | 264/114 |
| 4,973,440 | 11/1990 | Tamura et al. | 264/114 |

FOREIGN PATENT DOCUMENTS 54-150476 11/1979 Japan .
2021030 11/1979 United Kingdom .

*Primary Examiner*—Leo B. Tentoni
*Attorney, Agent, or Firm*—Omri M. Behr

[57] ABSTRACT

In a method for the production of a fiber-reinforced thermosetting resin molding material by a procedure of leading a mixture of a liquid thermosetting resin composition with reinforcing fibers to an impregnation apparatus and deaerating the mixture and impregnating the reinforcing fibers with the resin composition, apparatus including at least one pair of vertically opposed endless belts adapted to be driven in the directions of taking in and nipping the mixture and at least one pair of vertically opposed rollers adapted to depress the mixture across the endless belts, at least one of the opposed rollers being a flexible roller possessing elasticity.

3 Claims, 2 Drawing Sheets

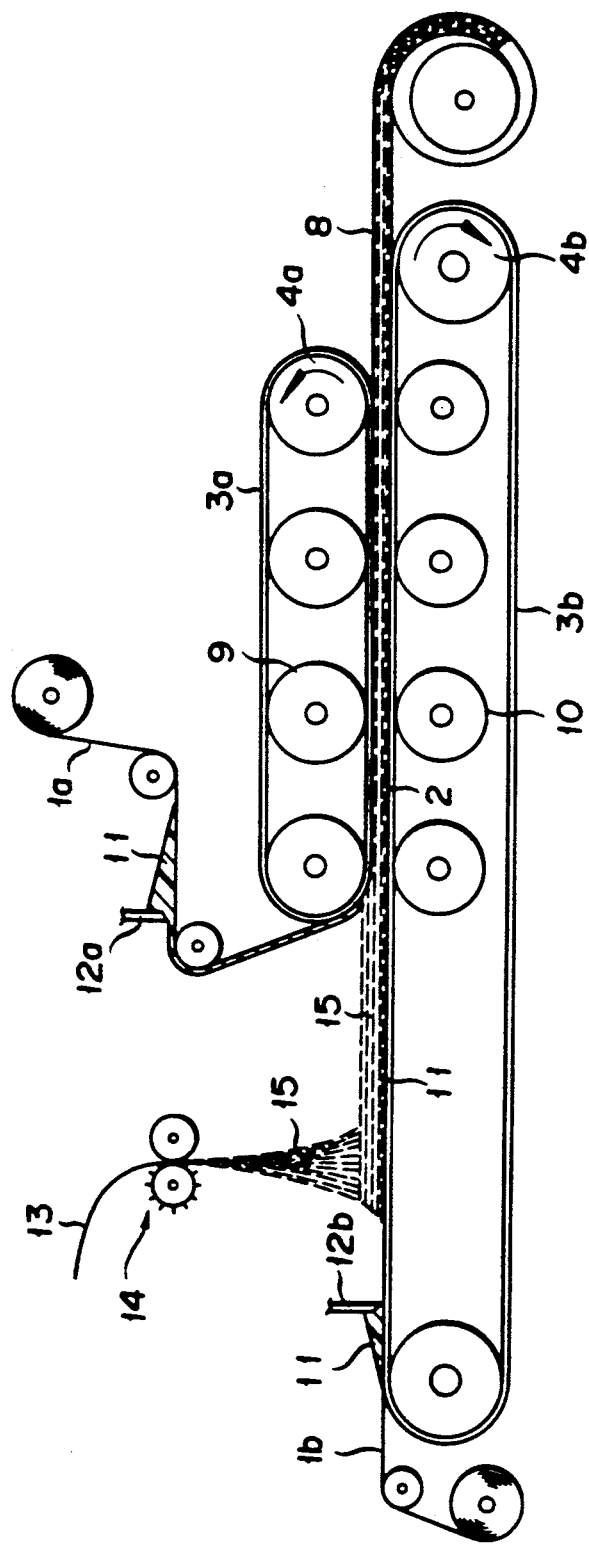

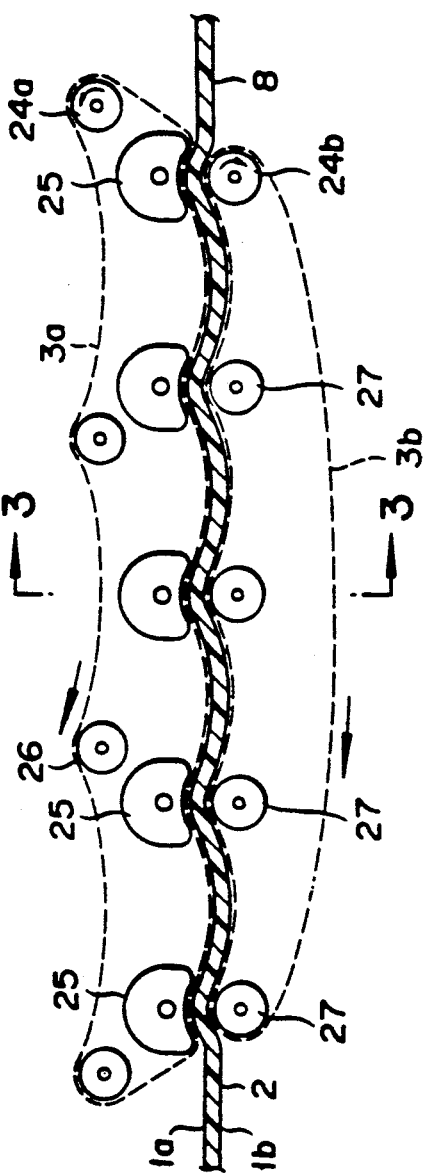

METHOD FOR PRODUCTION OF FIBER-REINFORCED THERMOSETTING RESIN MOLDING MATERIAL

BACKGROUND OF THE INVENTION

1. Field of the Invention

This invention relates to a method for the production of a sheetlike fiber-reinforced thermosetting resin molding material by the deaeration of a mixture of a liquid thermosetting resin composition with reinforcing fibers for impregnation of the fibers with the resin composition. More particularly, it relates to a method which effects thorough deaeration of the mixture and thorough impregnation of the fibers with the resin composition by exertion of a uniform pressing force on the mixture throughout the whole volume thereof without reference to possible variation in wall thickness of the mixture and which, therefore, produces a molding material of homogeneous quality.

2. Description of the Prior Art

Generally, the hot press quality fiber-reinforced thermosetting resin molding material is obtained by mixing a viscous liquid resin composition having such additives as filler, mold release agent, tackifier, and coloring agent in a resin solution such as of an unsaturated polyester resin with reinforcing fibers such as glass fibers and causing the reinforcing fibers to be impregnated with the resin solution. It is put to use for molding in a state free from excessive viscidity and flexible enough to permit easy handling.

The sheet molding compound (SMC) method may be cited as a representative of the conventional methods adopted for the production molding materials supplied in the form of sheet. The SMC method produces the molding material by applying a liquid resin composition to two vertically opposed plastic films of a polyolefin, causing reinforcing fibers of a small length cut as from a glass roving to be sprayed between the opposed plastic films, joining the vertically opposed plastic films thereby forming a laminate composed of a mixture of the resin composition and the reinforcing fibers, deaerating the laminate by rolling thereby ensuring thorough impregnation of the reinforcing fibers with the resin composition and consequent conversion of the laminate into a sheet, and winding the produced sheet into a roll.

One of the apparatuses heretofore employed for the impregnation involved in the SMC method is constructed as illustrated in FIG. 1. In this impregnation apparatus, a mixture 2 of a resin composition and reinforcing fibers supported between two vertically opposed films 1a and 1b is exposed to the pressing force to be exerted thereon by a plurality of impregnation-deaeration rollers 9, 9, . . . and 10, 10 . . . disposed in rows across a pair of vertically opposed endless belts 3a and 3b. While the mixture of the resin composition and the reinforcing fibers is passing between the endless belts 3a and 3b, the bubbles entrapped in the mixture are sequentially pushed out and the resin composition is forced into the gaps between the reinforcing fibers to effect the impregnation of the reinforcing fibers with the resin composition.

In the case of a molding material of insufficient impregnation and deaeration, products obtained by forming this molding material are liable to entail such defects as molding cavities, pinholes, and prominent fiber patterns. It is known that uneven impregnation aggravates the dispersion of product strength.

Various devices have been developed for the SMC method to attain thorough impregnation and deaeraton and allow manufacture of flawless formed products of high strength. It is nevertheless difficult to product SMC articles of large thickness. Generally, the largest thickness of sheet in which thorough impregnation and deaeration is attained is roughly on the order 2 to 3 mm. For the resin composition, such high viscosity as exceeding 1,000 poises is not suitable. Generally, the resin composition used for the SMC method has viscosity approximately in the range of 100 to 200 poises. Even in the case of a sheet material of such small thickness as used by the SMC method, the products of the SMC method are liable to suffer from excessive distribution of resin composition in the end parts thereof because the pressing force generated by the impregnation-deaeration rollers frequently induce the phenomenon of exudation of resin composition in the direction of width of the film. Further, the sheet which is taken up in a roll after the step of impregnation and deaeration is liable to entail the transfer of resin composition in the direction of width of the film under the tension of the film during the course of the winding.

For the purpose of preventing the exudation of resin composition during the step of winding, the practice of folding the lateral edges of the two vertically opposed films perpendicularly to the direction of travel of the sheet and joining the folded lateral edges while the sheet is in the process of transfer from the step of impregnation and deaeration to the step of winding has been in vogue. This practice, however, is not free from the heterogeneity of SMC owing to the transfer of the resin composition which occurs during the step of impregnation and deaeration.

Japanese Patent Laid-Open SHO 54 (1979)-150,476, for the purpose of providing efficient impregnation and deaeration for a mixture of a resin composition and reinforcing fibers, proposes an impregnation apparatus improved so as to compress the mixture and, at the same time, impart a shearing effect thereto. In this patent laid-open, there is a mention to the effect that by exerting the pressing force continuously and, at the same time, using a mesh belt, the relative movement of reinforcing fibers in the mixture is repressed and the transfer of the resin composition in the direction of width of the film is precluded because the resin composition enters the pockets formed in the openings of the meshed belt. Even with such kind of impregnation apparatus, it is difficult to have reinforcing fibers to be impregnated with a highly viscous resin composition whose liquid viscosity exceeds 1,000 poises. Thus, the impregnation apparatus produces a desired molding material with difficulty.

As a way of amply impregnating reinforcing fibers with a highly viscous resin composition without inflicting an injury to the reinforcing fibers, the method disclosed in U.S. Pat. No. 4,702,872 may be cited. In the sheet produced by this method, however, an effort to increase the thickness of this sheet entails a gradient variation of wall thickness in cross section of the edge parts of the sheet. With the conventional impregnation apparatus, therefore, it is difficult to exert a uniform pressing force to the edge parts of the sheet. Consequently a homogeneous sheet of large thickness with a satisfactory state of impregnation is not obtained.

An object of this invention, therefore, is to provide a novel method for the production of a fiber-reinforced thermosetting resin molding material.

Another object of this invention, in the production of a sheet like fiber-reinforced thermosetting resin composition by the impregnation of reinforcing fibers with a liquid thermosetting resin composition, is to provide a method for the production of a homogeneous molding material in a state of satisfactory state of impregnation, which method allows a pressing force to be exerted on the sheet uniformly throughout the entire surface including the edge parts without reference to the viscosity of the resin composition and the thickness of the sheet and ensures repression of the transfer of the resin composition.

SUMMARY OF THE INVENTION

In the production of a fiber-reinforced thermosetting resin molding material by a procedure of leading a mixture of a liquid thermosetting resin composition with reinforcing fibers to an impregnation apparatus and deaerating the mixture and impregnation the reinforcing fibers with the resin composition, the objects described above are accomplished by a method for the production of the fiber-reinforced thermosetting resin molding material by the use of an impregnation apparatus which comprises at least one pair of vertically opposed endless belts adapted to be driven in the directions of taking in and nipping the mixture and at least one pair of vertically opposed rollers adapted to depress the mixture across the endless belts, at least one of the opposed rollers is a flexible roller possessing elasticity.

In accordance with this invention, a fiber-reinforced thermosetting resin molding material of high quality is obtained which has the reinforcing fibers impregnated uniformly and thoroughly with the liquid resin composition without entailing exudation of the liquid resin composition in the direction of width of the film. This invention, therefore, allows production of a molding material of fine quality which is free from dispersion of strength and capable of giving rise to formed articles of flawless surface.

BRIEF DESCRIPTION OF THE DRAWINGS

FIG. 1 is a front view illustrating in schematic a typical conventional apparatus for the production of a sheet molding compound, FIG. 2 is a front view illustrating in schematic a typical step of impregnation as one embodiment of this invention, and FIG. 3 is a cross section taken through FIG. 2 along the line II—II.

EXPLANATION OF THE PREFERRED EMBODIMENT

Now, the method of this invention will be described in detail below with reference to the accompanying drawings.

FIG. 1 illustrates a typical conventional apparatus used for the production of SMC. In this apparatus, a thermosetting resin cmposition 11 supplied onto a film 1b made of polyethylene terephthalate, polyethylene, or polypropylene, for example, and disposed on an endless belt 3b is advanced by a drive roller 4b with the thickness of the layer of resin composition regulated by a coating device 12b such as a blade. On the resin composition 11 so advanced in a fixed thickness, such reinforcing fibers of small length as glass fibers and carbon fibers which are obtained by cutting a roving 13 in a prescribed size with a cutter 14 are sprayed. In the meantime, the same thermosetting resin composition supplied onto another film 1a is advanced by a drive roller 4a with the thickness thereof regulated by a coating device 12a such as a blade. Where the film reaches a point above the reinforcing fibers 15, the layers of resin composition 11 and 11 jointly take in and nip the reinforcing fibers 15 and then expose themselves to the pressing force exerted thereon across at least one pair of vertically opposed endless belts by a plurality of impregnation-deaeration rollers disposed in rows.

In this case, the pair of endless belts 3a, and 3b press the layers of resin composition 11 and 11 supported on the two vertically opposed films 1a and 1b and the reinforcing fibers 15 interposed therebetween as illustrated in FIGS. 2 and 3, with the result that the resin composition 11 and the reinforcing fibers 15 are mixed to give rise to a mixture as the result of the reinforcing fibers being impregnated with the resin composition. The mixture is driven in the direction of being taken in and nipped between the endless belts 3a and 3b. Inside the upper endless belt 3a, a drive roller 24a for driving the belt 3a, guide rollers 26 for supporting the belt on the side not continuous to the film 1a, and impregnation deaeration flexible rollers 25 adapted to exert a pressing force upon the mixture 2 supported on the films 1a and 1b across the belt 3a.

These rollers 25 are flexible rollers possessing elasticity and, therefore, are allowed to follow the contour of the mixture of the resin composition and the reinforcing fibers and manifest the pressing force uniform in the direction of width of the mixture. These flexible rollers may be solid rubber rollers or hollow rubber rollers having the pressure thereof adjusted with the gas contained therein, for example. They need not be limited to rollers made of rubber but may be rollers made of a flexible material capable of generating an elastic force in response to the external force tending to deform the rollers. For the purpose of this invention, at least one pair of vertically opposed impregnation-deaeration rollers are used. These rollers manifest the pressing force between their opposed surfaces. When the vertically opposed impregnation-deaeration rollers are both made of a rigid material or when the two such flexible rollers are not disposed so as to be vertically opposed to each other, the uniform impregnation of the reinforcing fibers with the resin composition and the uniform deaeration of the mixture are not fully attained.

Inside the lower belt 3b, a drive roller 24b rotated at the same peripheral speed as the upper belt 3a and synchronized to the drive roller 24a serving to drive the upper belt 3a and impregnation-deaeration supporting rollers 27 disposed opposite the impregnation-deaeration flexible rollers 25 inside the upper belt 3a and adapted to support the pressing force of the flexible rollers 25. In the present embodiment, the roller 25 and the roller 27 constitute the vertically opposed rollers of the present invention.

The mixture 2 of the resin composition with the reinforcing fibers is brought in the form of a pile containing bubbles abundantly. After the passage through the impregnation apparatus, it assumes the form of a deaerated sheet possessing roughly twice as high bulk density as the pile. When the sheet consequently formed has a thickness exceeding 10 mm, the pile of mixture 2 has a cross section approximating a trapezoid the opposite lateral end parts of which are inevitably in a gradient wall thickness. This inclination gains in sharpness in proportion as the thickness is increased. As the result, rollers of a rigid material cannot conform with the contour of the pile of mixture and the reinforcing fibers cannot be wholly impregnated with the resin composition. The sheetlike molding material to be obtained by the method of this invention has a thickness in the range of 5 to 50 mm, preferably 10 to 20 mm. The impregnation-deaeration flexible rollers 25 in the present embodiment are formed of a shaft and a layer of elastic rubber disposed around the shaft, with air filling the space intervening between the shaft and the rubber layer. They are put to use after the pressure they are destined to exert has been adjusted to suit the liquid viscosity of the resin composition and the glass content of the mixture 2 to be used. The impregnation-deaeration flexible rollers 25 whose pressure has been adjusted enough for the rollers to follow faithfully the contour of the mixture cover the surface of the mixture 2 of resin composition and reinforcing fibers along the axial direction of rollers through the medium of the upper belt 3a and the upper film 1a to exert a uniform pressing force to the whole mass of the mixture 2. Since these rollers 25 cover even the edge parts of the mixture 2 and, at the same time, exert the pressing force, they serve the purpose of repressing the relative movement of the reinforcing fibers in the mixture 2 and, at the same time, precluding the otherwise possible transfer of the resin composition in the direction of width of the film. The plurality of impregnation-deaeration flexible rollers 25 arranged in rows are capable of independent pressure adjustment. For the deaeration and impregnation to be smoothly effected, the pressure levels of the flexible rollers 25 are desired to be gradually increased in the direction of the travel of the mixture 2.

The at least one pair of vertically opposed endless belts to be used in the present invention are driven in directions such as to take in and nip the mixture of a resin composition and reinforcing fibers and are enabled to exert the pressing force of the impregnation-deaeration rollers uniformly on the entire surface of the sheet-like mixture without reference to the thickness of the sheet. They also improve the state of impregnation by curbing the otherwise possible transfer of the resin composition. Thus, the present invention provides a molding material of highly desirable and homogeneous quality.

The liquid thermosetting resin composition to be used in the present invention is obtained by mixing a radically polymerizable resin such as unsaturated polyester resin or vinyl ester resin which assumes a liquid state at normal room temperature with such additives as fillers, thickeners, mold release agents, curing catalysts, coloring agents, shrinkage diminishing agents, and ultraviolet absorbents which are generally used in the art. The viscosity of the resin composition is in the range of 100 to 10,000 poises, preferably 400 to 3,000 poises.

The unsaturated polyester resin is obtained by preparing an unsaturated polyester, i.e. a polycondensate between an acid component comprising an alpha,beta-unsaturated dibasic acid such as maleic acid or fumaric acid and/or anhydride thereof and optionally a saturated polybasic acid such as phthalic anhydride, tetrahydrophthalic anhydride, tetrachlorophthalic anhydride, or succinic anhydride and a polyhydric alcohol such as ethylene glycol, diethylene glycol, propylene glycol, 1,3-butanediol, or hydrogenated bisphenol A and then dissolving the unsaturated polyester with a vinyl monomer such as styrene, vinyl toluene, or diallyl phthalate. The vinyl ester resin is obtained by deriving a compound such as an epoxy resin or a modification thereof from bisphenol A, bisphenol F, brominated bisphenol A, phenol novolak, brominated phenol novolak, or cresol novolak and epichlorohydrin and/or 2-methyl epichlorohydrin and possessing at least two epoxy groups in the molecular unit thereof, esterifying the compound mentioned above with acrylic acid or methacrylic acid thereby forming a vinyl ester, and dissolving the vinyl ester in a vinyl monomer such as styrene, vinyl toluene, or diallyl phthalate.

The reinforcing fibers to be used in the present invention may be inorganic fibers such as glass fibers or carbon fibers or organic fibers such as vinylon fibers or aromatic nylons such as Aramides by du Pont fibers. These reinforcing fibers may be short-staple fibers or continuous fibers. Length of such fiber is not specifically limited but preferably in the range of 0.5 to 2 inches.

Now, the invention will be described more specifically below with reference to working examples.

EXAMPLE

A resin composition prepared by combining a low-profile unsaturated polyester resin (produced by Nippon Shokubai Kagaku Kogyo Co., Ltd. and marketed under Japanese trademark designation of "Epolac N-11") with additives used in proportions indicated in Table 1 was treated by an apparatus constructed as illustrated in FIGS. 1 to 3 to produce a sheet-like molding material (20 mm in thickness).

In the example described herein, sheet-like molding materials were produced on the conditions that glass fibers (roving) were 0.5 inch length, and each of viscosities of liquid resin composition was varied from 250 to 1,350 poises. The molding materials thus obtained were evaluated for glass content and degree of impregnation to glass at the both side end portions of them (5 cm crosswisely peripheral circumfernces). The molding materials were crosswisely cut into 5 cm width pieces, and they were press molded into 3 mm thickness plates. The plates were visually evaluated for surface conditions, i.e. degree of cavity and condition of fibrous. The results are shown in Table 1.

In the example, the impregnation-deaeration apparatus comprised having five pairs of flexible rollers 25 with 15 cm in diameter and 70 cm in length and receive rollers made out of stainless steel with 8 cm in diameter and 70 cm in length accommodated therein, where each of flexible roller was filled in its rubber layer so as to control the pressure with the range of 0.5 to 1.0 kg/cm$^2$.

Molding materials produced by the conventional method using composition as shown in Table 1 were also similarly evaluated. The results are shown in Table 1.

TABLE 1

|  | Conventional method | | Method of this invention | | |
| --- | --- | --- | --- | --- | --- |
| Composition of molding material |  |  |  |  |  |
| Low-profile unsaturated polyester resin (EPOLAC N-11) (wt %) | 30.0 | 30.0 | 32.9 | 30.0 | 27.3 |
| Filler (calcium carbonate, average particle diameter | 43.0 | 43.0 | 40.0 | 43.0 | 45.9 |

TABLE 1-continued

|  | Conventional method | | Method of this invention | | |
| --- | --- | --- | --- | --- | --- |
| 2 microns) (wt %) | | | | | |
| Mold release agent (zinc stearate) (wt %) | 1.13 | 1.13 | 1.23 | 1.13 | 1.02 |
| Curing agent (t-butyl peroxybenzoate) (wt %) | 0.29 | 0.29 | 0.31 | 0.29 | 0.26 |
| Coloring agent (chrome yellow) (wt %) | 0.29 | 0.29 | 0.31 | 0.29 | 0.26 |
| Thickener (magnesium oxide) (wt %) | 0.29 | 0.29 | 0.31 | 0.29 | 0.26 |
| Glass fibers ¼ inch chopped fiber strand (wt %) | 25 | 25 | 25 | 25 | 25 |
| Viscosity of resin composition (Poise) | 800 | 800 | 250 | 800 | 1350 |
| Evaluation at end of molding material (cut into 5 cm in width) | | | | | |
| Glass content at end of material | 19–22 | 25–28 | 23–27 | 24–27 | 24–28 |
| Impregnation condition at the end of molding material | Good | Poor | Good | Good | Good |
| Evaluation of molding material with 3 mm' plate press | | | | | |
| Surface condition | | | | | |
| Cavity | No | Yes | No | No | No |
| Fibrous | No | Yes | No | No | No |

Since the present invention is not only capable of avoiding transferring the molding material of resin composition to the side end portions thereof, which is involved in the application of the conventional impregnation-deaeration apparatus but also capable of uniformly applying pressing force overall the molding materials, it can easily give uniform, fiber-reinforced thermosetting resin molding materials with less partial deviation of glass content based on prescribed glass content and having good impregnation at the side ends of the molding materials. Hence, this invention can present excellent formed product with less deviation of strength and less flow of the surface thereof.

What is claimed is:

1. In a method for the production of a fiber-reinforced thermosetting resin molding material by a procedure of leading a mixture of a liquid thermosetting resin composition with reinforcing fibers to an impregnation apparatus and deaerating said mixture and impregnating said reinforcing fibers with said resin composition, the improvement which comprises the use of an impregnation apparatus comprising at least one pair of vertically opposed endless belts adapted to be driven in a direction of taking in and nipping said mixture and at least one pair of vertically opposed rollers adapted to depress said mixture across said endless belts, at least one of said opposed rollers being a flexible roller possessing elasticity and being allowed to follow the contour of said mixture to provide a sheet having a thickness of from 5 to 50 mm said flexible rollers being hollow rubber rollers having the pressure levels thereof adjusted with a gas contained therein.

2. A method according to claim 1, wherein a plurality of pairs of rollers are used.

3. A method according to claim 1, wherein said liquid thermosetting resin is an unsaturated polyester resin and said reinforcing fibers are glass fibers.

* * * * *